Dec. 8, 1970     F. L. J. SANGSTER     3,546,490

MULTI-STAGE DELAY LINE USING CAPACITOR CHARGE TRANSFER

Filed Oct. 17, 1967     10 Sheets-Sheet 1

INVENTOR.
FREDRIK L. J. SANGSTER

BY

*Frank R. Trifari*

AGENT

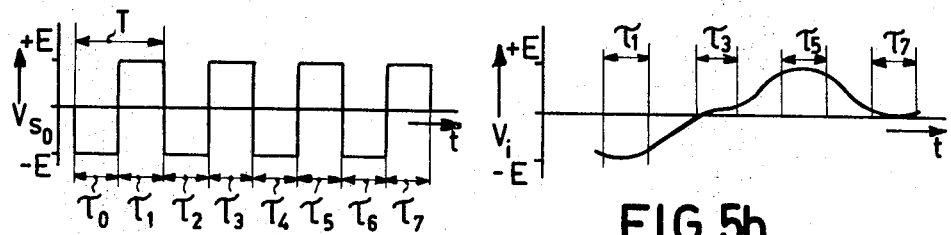
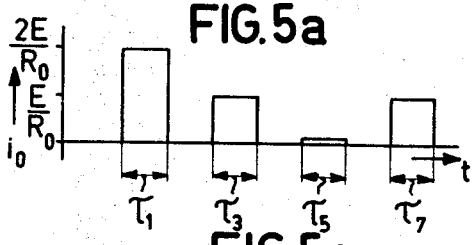
FIG.5a
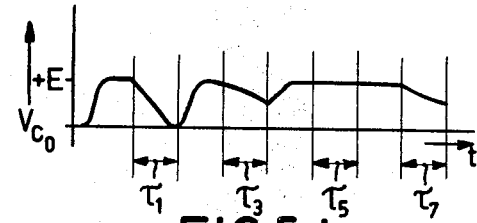
FIG.5b
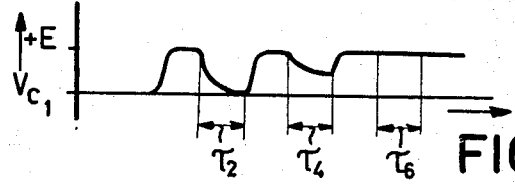
FIG.5c  FIG.5d
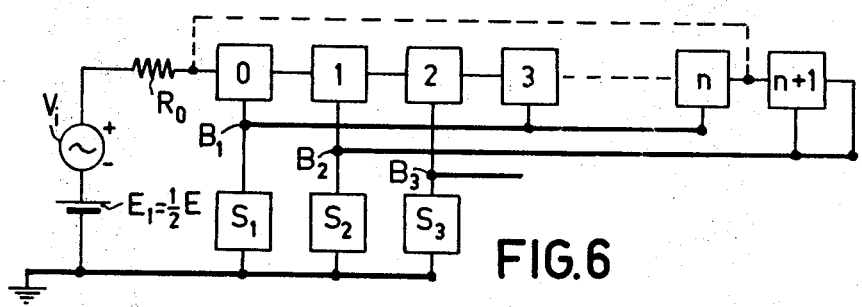
FIG.5e
FIG.6
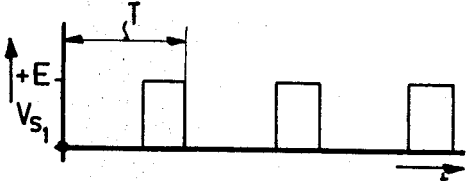
FIG.7a
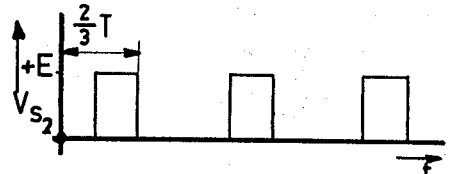
FIG.7b
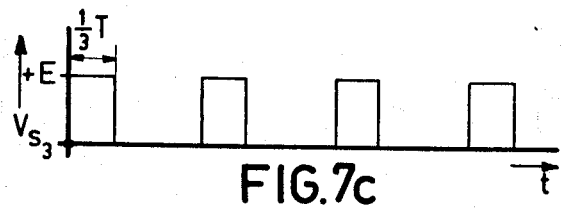
FIG.7c
INVENTOR.
FREDERIK L.J. SANGSTER
BY
*Frank R. Trifari*
AGENT Dec. 8, 1970  F. L. J. SANGSTER  3,546,490
MULTI-STAGE DELAY LINE USING CAPACITOR CHARGE TRANSFER
Filed Oct. 17, 1967                                10 Sheets-Sheet 5

INVENTOR.
FREDERIK L.J. SANGSTER

BY

AGENT

INVENTOR.
FREDERIK L.J. SANGSTER

BY

AGENT

Dec. 8, 1970   F. L. J. SANGSTER   3,546,490
MULTI-STAGE DELAY LINE USING CAPACITOR CHARGE TRANSFER
Filed Oct. 17, 1967   10 Sheets-Sheet 10

INVENTOR.
FREDERIK L.J. SANGSTER
BY
AGENT

United States Patent Office 3,546,490
Patented Dec. 8, 1970

3,546,490
MULTI-STAGE DELAY LINE USING
CAPACITOR CHARGE TRANSFER
Frederik Leonard Johan Sangster, Emmasingel, Eindhoven, Netherlands, assignor, by mesne assignments, to U.S. Philips Corporation, New York, N.Y., a corporation of Delaware
Filed Oct. 17, 1967, Ser. No. 675,883
Claims priority, application Netherlands, Oct. 25, 1966, 6615057, 6615058; Aug. 18, 1967, 6711463
Int. Cl. H03k 5/159, 17/28, 17/60
U.S. Cl. 307—293
14 Claims

ABSTRACT OF THE DISCLOSURE

A multi-stage delay line where each stage a capacitor is connected directly across the base and collector terminals of a transistor. Each stage uses the transistor emitter for an input terminal, the collector for an output terminal, and the base as a control terminal for driving the transistor into conduction in response to a switching voltage applied to alternate stages.

---

This invention relates to a circuit for transferring charge from a first capacitor to a second capacitor by electronic switching means. The charge is supplied to the first capacitor by means of an input circuit. The charge is removed from the second capacitor by means of an output circuit.

This kind of a circuit is frequently used in capacitor memories and in delay lines, for example, audio-frequency or video-frequency signals. It is then necessary for the energy in a first capacitor to be transferred to a second capacitor with as little loss as possible.

In a known circuit of this kind an amplifier is included between a first capacitor and a second capacitor, said amplifier having a high input resistance and a low output resistance. In this circuit the second capacitor is first charged through a switch associated with it to the voltage of the first capacitor. Subsequently the connection between the first and second capacitors is interrupted and the first capacitor is discharged through another switch associated with it. This known circuit suffers from the disadvantage that three operations are necessary for transferring the energy from the first capacitor to the second capacitor.

The present invention makes it possible to provide a circuit of the kind described which can be built up with considerably simpler elements and which is furthermore suitable to be integrated.

The invention is characterized in that a transistor is arranged between the first and the second capacitor, these capacitors being included in the emitter circuit and in the collector circuit respectively, while a switching voltage source which controls the transfer of charge is arranged between the connection of the second capacitor which is remote from the collector and the connection of the first capacitor which is remote from the emitter, said source being also included between the last-mentioned connection and the base of the transistor.

This circuit is preferably used in a devise for delaying electric signals, the device comprising succeeding circuits which are built up in the same manner so that in succeeding stages the second capacitor of the first stage is also the first capacitor of the second stage, and the second capacitor of the second stage is also the first capacitor of the third stage, etc.

In order that the invention may be readily carried into effect it will now be described in detail, by way of example, with reference to the accompanying diagrammatic drawing in which:

FIG. 1 shows the circuit diagram of the invention while

FIG. 3 shows a device for delaying electric signals for use of the circuit according to the invention while FIG. 5 shows the voltage variation at several points of the device as a function of time.

FIG. 6 shows another device for use of the circuit according to the invention, while FIG. 7 shows as a function of time the variations in the voltages from the switching voltage sources $S_1$, $S_2$ and $S_3$ of FIG. 6.

FIG. 8 shows another device for use of the circuit according to the invention while

FIG. 12 shows another device for use of the circuit according to the invention while

FIG. 15 and FIG. 17 show a filter circuit for use of the device of FIG. 3 while

Figure 1:
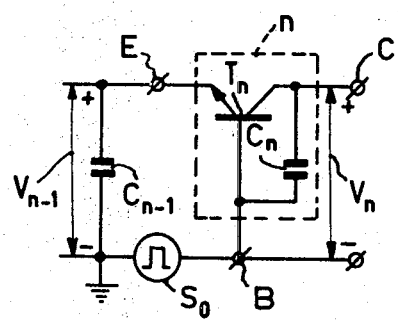
Figure 2:
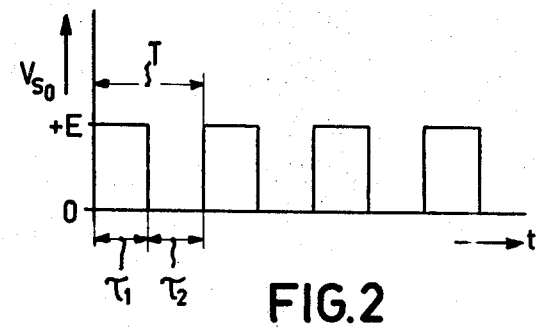
FIG. 2 shows the variation in the voltage from the switching voltage source $S_0$ of FIG. 1.

In the circuit diagram of FIG. 1, $T_n$ is an npn-type transistor, $C_{n-1}$ is a first capacitor and $C_n$ is a second capacitor. $S_0$ is a switching voltage source which provides, for example, a voltage having the waveform shown in FIG. 2. From this figure it can be seen that the voltage between the base and ground is E volts during the time interval $\tau_1$ and is 0 volt during the time interval $\tau_2$.

The switching voltage source $S_0$ is included between the capacitors $C_n$ and $C_{n-1}$. The base of transistor $T_n$, is connected to the connection of capacitor $C_n$ which is remote from the collector. The voltage between the base of the transistor and ground is E volts during the time interval $\tau_1$. The transistor will conduct as long as the voltage across the capacitor $C_{n-1}$ is less than E volts, the base-emitter threshold voltage of transistor $T_n$ being disregarded. A current will flow through the transistor which causes an increase in the voltage across the capacitor $C_{n-1}$ and a decrease in the voltage across the capacitor $C_n$. If the two capacitors are of the same value and if the collector-emitter current gain factor is assumed to be equal to unity, then the voltage across capacitor $C_{n-1}$ will increase in the same period to the same extent as the voltage across capacitor $C_n$ will decrease.

The output voltage across capacitor $C_{n-1}$ will be E volts, since upon reaching this voltage the base-emitter junction of transistor $T_n$ becomes cut-off. Consequently the output voltage across capacitor $C_n$ will be equal to $(V_n - \Delta V)$ volts, where $\Delta V$ is equal to the increase in voltage across capacitor $C_{n-1}$ and where $V_n$ is the voltage across capacitor $C_n$ at the beginning of the transfer of charge between the two capacitors. When the voltage E volts is taken as a reference level for the information —$\Delta V$ which was present in capacitor $C_{n-1}$, the information $-\Delta V$ has passed to capacitor $C_n$, while capacitor $C_{n-1}$ has at the same time been charged to the reference level and hence is again in a condition for receiving new information from a preceding store element. Thus no separate switching operation is required for discharging capacitor $C_{-n1}$ in order to bring it into a state for dealing with further information.

Figure 3:
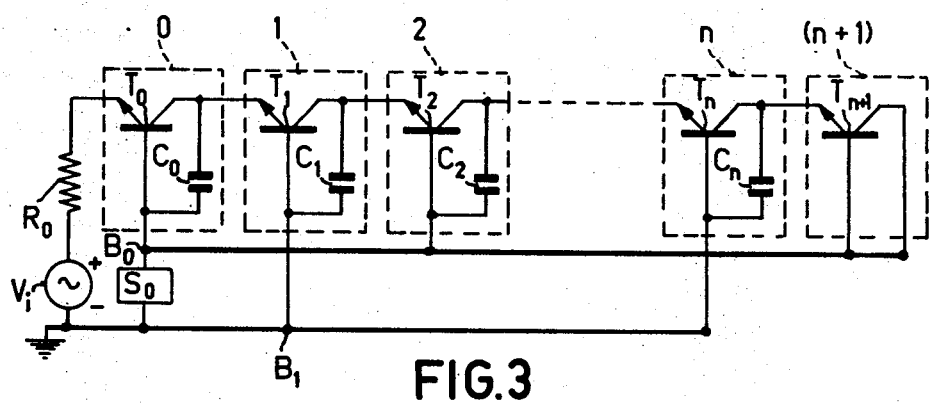
Figure 4:
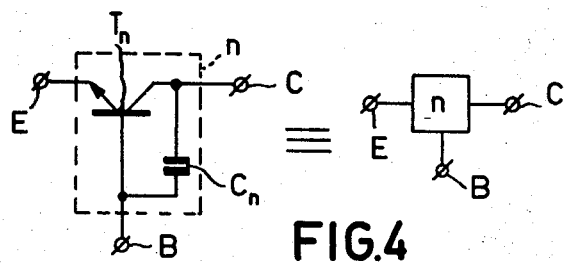
FIG. 4 shows the circuit which comprises the units of the FIGS. 6, 8, 12 and 17.

The device shown in FIG. 3 for delaying electric signals comprises a chain circuit of $(n+1)$ stages each including a transistor with a capacitor arranged between its collector and its base. Such a stage as well as a symbolic view thereof are shown in FIG. 4. For the sake of clairity it is mentioned that the characters E, B and C of FIG. 1 correspond to the characters E, B and C of FIG. 4. In the further description E is the emitter input, C is the collector output and B is the base input of the stage considered. In FIG. 3, the collector output of each stage is D.C. connected to the emitter input of the succeeding stage, except for the $(n+1)°$ stage where the collector output is connected to the base input of the said stage. The output signal of the chain circuit is derived from the collector output of the $n°$ stage. The emitter input of the stage 0 is connected to ground through the series-combination of a resistor $R_1$ and an input signal source $V_1$. The base inputs of the even stages 0, 2, 4, etc. are connected to earth through the switching voltage source $S_0$, whereas the base inputs of the odd stages 1, 3, 5, etc. are connected directly to earth.

For better understanding of the performance of the device of FIG. 3, the voltage waveforms at several points of this device are shown below one another as a function of time in FIG. 5. Graph 5a shows the voltage variation of the switching voltage source $S_0$. It is a symmetrical square-wave voltage with $+E$ volts at its maximum and $-E$ volts at its minimum, the period of the said squarewave voltage being equal to T sec. This period must be at least a factor of 2 smaller than the period of the highest signal frequency occurring in the input signal $V_1$, which signal is shown in FIG 5b. During the time interval $\tau_0$, $\tau_2$, $\tau_4$ and $\tau_6$ point $B_0$ of FIG. 3 has a potential of $-E$ volts relative to point $B_1$. The transistor $T_n$ will not conduct during the said time interval if the input voltage is $V_1 > -E$ volts. In addition the even transistors $T_2$, $T_4$, etc. will not conduct since the voltages across the odd capacitors $C_1$, $C_3$, etc. can never exceed $+E$ volts. The odd transistors will conduct during the same time intervals as long as the voltages across the even capacitors are less than E volts. The even capacitors are charged until their potential has become equal to E volts, while the voltage across each odd capacitor will decrease to the same extent as the voltage across the preceding even capacitor will increase. Thus it is assumed that all of the capacitors have the same value and that the collector-emitter current gain factor of each transistor is equal to unity.

During the period in which point $B_0$ has a voltage of $+E$ volts relative to point $B_1$, information concerning the magnitude of the input signal $V_1$ is transmitted to the capacitor $C_0$ and hence during the time intervals $\tau_1$, $\tau_3$, $\tau_5$ and $\tau_7$ according to FIG. 5a.

The magnitude of the input signal during these time intervals is $-E$, 0, $+E$ and 0 volts respectively. During these time intervals a current will flow through the transistor $T_0$ which is equal to $(E-V_1)/R_0+r$ maps, which current causes a decrease in the voltage of E volts, set up across capacitor $C_0$. The currents flowing through the transistor $T_0$ during the said time intevals are shown in FIG. 5c, the behaviour of the voltage across capacitor $C_0$ being shown in FIG. 5d. From the latter figure it can be seen that the voltage drops across capacitor $C_0$ during the time intervals $\tau_1$, $\tau_3$, $\tau_5$ and $\tau_7$ vary linearly with time. This is true only if the resistor $R_0$ has a value which is many times higher than the internal base-emitter resistance of transistor $T_0$. The greatest decrease in voltage occurs during the time interval $\tau_1$, namely $\Delta V=E$ volts, while the voltage drop during the interval $\tau_5$ is equal to 0 volt. Thus a linear relationship between the voltage drop $\Delta V$ across capacitor $C_0$ and the input signal will exist only for input signals located in the range $$-E \leq V_i \leq +E$$

volts. The resistor $R_0$ must be given a value such that, for an input signal of 0 volt, the voltage across capacitor $C_0$ has become exactly equal to 0.5E volts during the period in which point $B_0$ has a potential of $+E$ volt relative to earth. The mean charging current $i_{gem}=E/R_0+r$ required therefore is determined by the value of capacitor $C_0$ and the duration of each period T in which the potential of point $B_0$ is equal to $+E$ volts. The said charging current is equal to $C_0E/2\tau$, wherein 0.5E is the voltage drop across capacitor $C_0$ for an input signal of 0 volt. From this it follows that $\tau=0.5 \cdot C_0 \cdot R_0$ must apply for correct adjustment of the mean charging current, referred to as zero adjustment. Advantageous values for the zero adjustment in connection with a satisfactory signal-to-noise ratio and the required switching power lie between 1$\mu$ amp. and 1 m. amp.

The device of FIG. 3 can be used for delaying the transit time of, for example, audio-frequency or video-frequency signals. The delay time per stage is then equal to 0.5 T sec. so that the total delay in transit time after the stage $n$ will be equal to 0.5 $(n+1)T$. This transit-time delay per stage can be raised by means of a device as shown in FIG. 6. This device includes three switching voltage sources $S_1$, $S_2$ and $S_3$ arranged between earth and points $B_1$, $B_2$ and $B_3$ respectively. The waveforms of the voltages provides by said switching sources are shown as a function of time in FIG. 7. Point $B_3$ has a potential of $+E$ volts relative to earth during the first ⅓ T sec. of each scan period T, which must be at least 2 times as small as the period of the highest signal frequency occurring, whereas points $B_1$ and $B_2$ have earth potential. During the succeeding ⅓ T sec. of each scan period T, point $B_2$ has a potential of $+E$ volts relative to earth, whereas points $B_1$ and $B_3$ have earth potential. During the final ⅓ T sec. of each scan period, point $B_1$ has a potential of $+E$ volts relative to earth, whereas points $B_2$ and $B_3$ have earth potential. During this final ⅓ T sec. of each scan period information is transferred from the stage 0 to the capacitor $C_0$, whilst there is no transfer of new information during ⅔ T sec. of each scan period. Thus the delay per stage has now become ⅔ T sec. so that the transit-time delay after the stage $n$ will now be $$\tfrac{2}{3} \cdot (n+1) \cdot T \text{ sec.}$$

FIG. 6 shows an example of three switching voltage sources and three leads $B_1$, $B_2$ and $B_3$ which connect the base inputs of the stages 0, 3 and 1, 4 and 2, 5 respectively. However, as a rule, $p$ switching sources and $p$ leads $B_1$ to $B_p$ can be used. In this case there is switched $p$ times per scan period and $T/p$ sec. only is used for transferring information. The delay time per stage will now be $$\frac{p-1}{p} T \text{ sec.}$$

However, $p$ switching sources are now also required. Dependent upon the desired bandwidth and the total delay time which is desired, there will be a value for $p$ at which the total number of stages required is a minimum.

Figure 8:
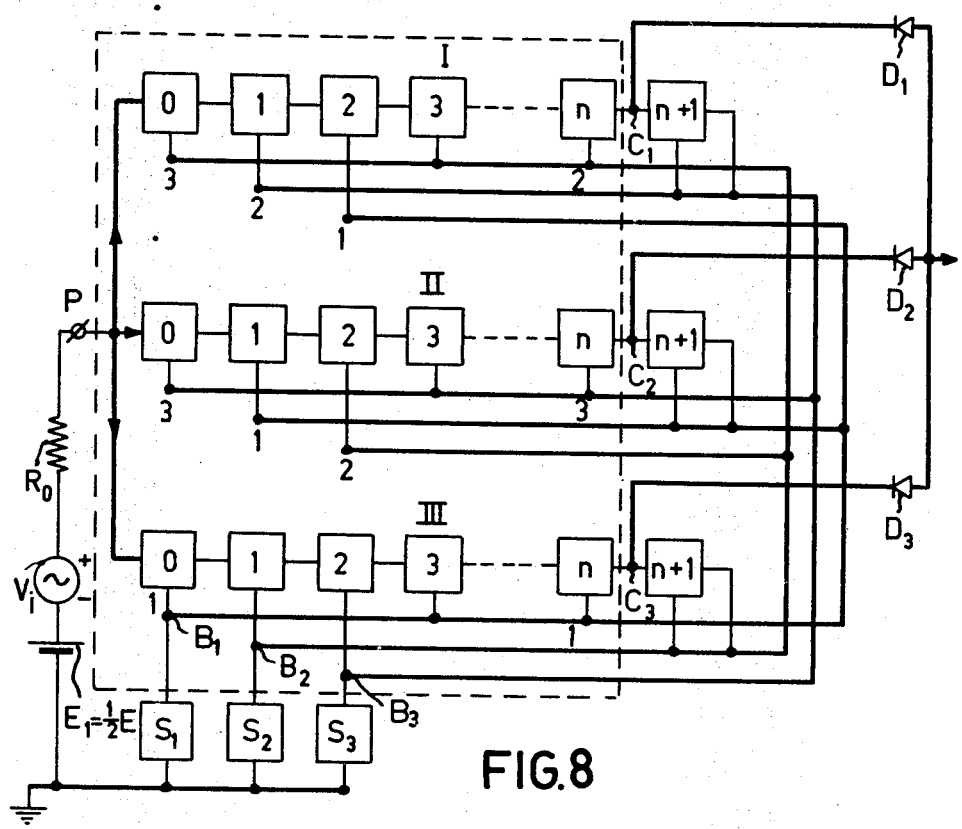
Figure 9A:
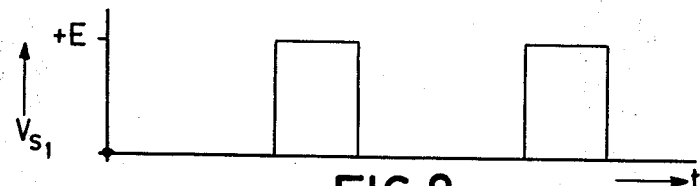
FIG. 9 shows as a function of time the variations in the voltages from the switching voltage sources $S_1$, $S_2$ and $S_3$ of FIG. 8.
Figure 9B:
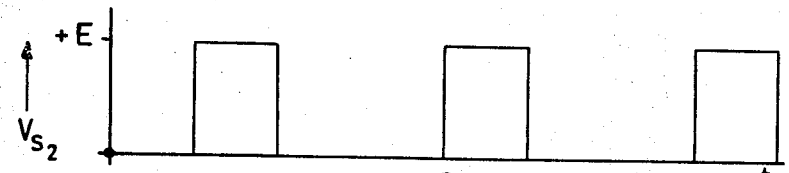
Figure 9C:
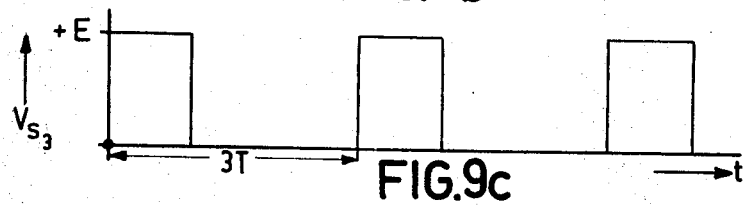

FIG. 8 shows a device for delaying electric signals which has the advantage relative over the devices of FIG. 3 and FIG. 6 that, with the total delay time unchanged the losses occurring during the transfer of information between the capacitors are limited due to the collector emitter current gain factors not being exactly equal to unity. In this figure three congruent chains I, II and III are connected in parallel. The bases of the transistors in the stages $III_0$, $III_3$, $II_1$, $I_2$ are connected to ground through the switching voltage source $S_1$. The bases of the transistors in the stages $III_1$, $II_2$, $I_0$ and $I_3$ are connected to ground through the switching voltage source $S_2$, while the bases of the transistors in the stages $III_2$, $II_0$, $II_3$, $I_1$ are connected to ground through the switching source $S_3$. The emitter inputs of the first three stages $I_0$, $II_0$ and $III_0$ are connected to a point of constant potential through the resistor $R_0$ and the signal source $V_1$. The collector outputs of the stages $I_n$, $II_n$ and $III_n$ are connected together through blocking diodes $D_1$, $D_2$ and $D_3$ respectively. The output comes with cyclic alternation from one of the stages $I_n$, $II_n$ and $III_n$, while information is transferred to one of the stages $I_0$, $II_0$ and $III_0$ likewise with cyclic alternation. It is thus achieved that the period of the squarewave voltages from the switching sources $S_1$, $S_2$ and $S_3$ is allowed to be equal to $3T$, where $T$ is at least twice as small as the period of the highest signal frequency occurring. The said squarewave voltages have waveforms as shown in FIG. 9. Transfer of information takes place between two capacitors during $$\frac{1}{3} \cdot 3T \text{ sec.}$$

of each period $3T$, whereas no transfer of information takes place during $$\frac{2}{3} \cdot 3T \text{ sec.}$$

This means that the delay time per stage is equal to $$\frac{2}{3} \cdot 3T \text{ sec.}$$

so that three times femer stages in each of the chains I, II and III are necessary for obtaining a given total delay time. If in general $n$ chains are connected in parallel similarly as has been effected for three chains in FIG. 8, the said losses can be reduced by a factor of $1/n$.

Figure 10:
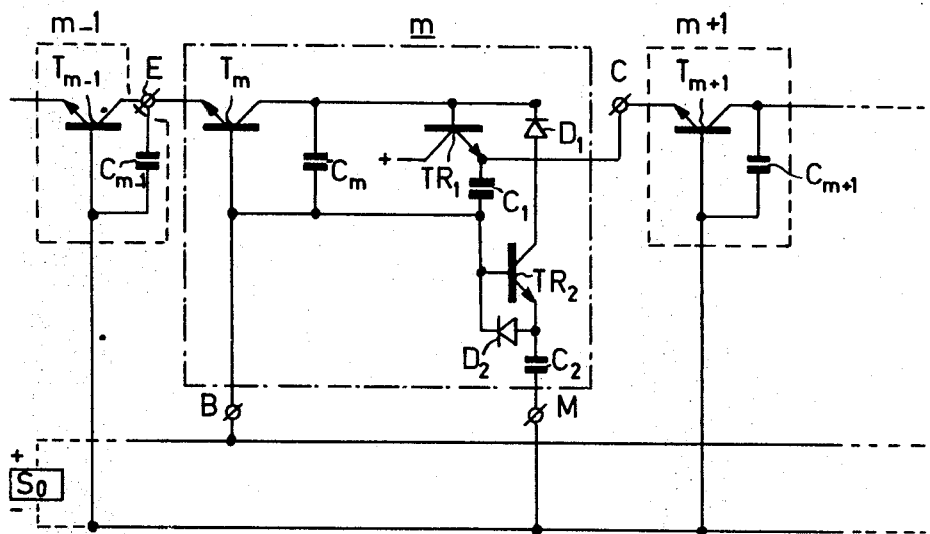
FIG. 10 shows the circuit of a unit $m$ which may replace at least one unit of the FIGS. 3, 6, 8, 12 and 17.

By replacing at least one stage in the devices of FIG. 3, 6 or 8 by a stage $m$ of FIG. 10 compensation for the previously mentioned losses is achieved. The stage $m$ shown in this figure has an emitter input E which is connected to the emitter of a transistor $T_m$, a base input B which is connected to the base of the transistor $T_m$ and a collector output C which is connected through a diode $D_1$ to the collector of the transistor $T_m$. The collector of the transistor $T_m$ is connected on the one hand through a capacitor $C_m$ to the base of the transistor $T_m$ and is connected on the other hand to the base of a transistor $TR_1$ while the collector of the transistor $TR_1$ is connected to a point of constant potential. The diode $D_1$ is connected between the base and the emitter of the transistor $TR_1$. The emitter of the transistor $TR_1$ is connected through the capacitor $C_1$ to the base of the transistor $T_m$ and to the base of the transistor $TR_2$. The emitter of the transistor $TR_1$ is also connected to the collector of the transistor $TR_2$. A diode $D_2$ is provided between the base and the emitter of transistor $TR_2$ while the emitter of transistor $TR_2$ is connected to earth through the capacitor $C_2$. The emitter input E of the stage $m$ is connected to the collector output of the stage $(m-1)$. The collector output of the stage $m$ is connected to the emitter input of the stage $(m+1)$ while the base input of the stage $m$ is connected to ground through the switching voltage source $S_0$ which source supplies a voltage as is indicated in FIG. 5a. The base inputs of the two stages $(m-1)$ and $(m+1)$ are connected to ground. The operation of the stage $m$ of the circuit of FIG. 10 is as follows:

During the time intervals $\tau_0$, $\tau_2$, $\tau_4$ and $\tau_6$ (FIG. 5a) the transistor $T_{m+1}$ conducts and the capacitors $C_m$ and $C_1$ are charged until the voltage across these capacitors has become equal to E volt. The capacitor $C_2$ is discharged during the mentioned time intervals through the diode $D_2$. During the time intervals $\tau_1$, $\tau_3$, $\tau_5$ and $\tau_7$ (FIG. 5a) the transistor $T_m$ conducts and the information V, which is present in the capacitor $C_{m-1}$, is passed on to the capacitor $C_m$. The output voltage across the capacitor $C_m$ will then be equal to $(E-\Delta V)$ volt. During the latter time intervals the capacitor $C_1$ is also discharged by the pump circuit ($TR_2$, $D_2$, $C_2$) until the voltage across this capacitor has become equal to $(E-\Delta V)$ volt. During the time intervals succeeding the latter time intervals both the information $\Delta V$ present in the capacitor $C_m$ and the information $\Delta V$ present in the capacitor $C_1$ is passed on to the capacitor $C_{m+1}$. The output voltage across the capacitor $C_{m+1}$ will then be equal to:

$$\frac{C+C_1}{C} \Delta v \text{ volt}$$

in which C is the capacitance value of the capacitors $C_m$ and $C_{m+1}$. Consequently, by providing the stage $m$ between the stages $(m-1)$ and $(m+1)$ of FIG. 10 it is achieved that the information V in the capacitor $C_{m-1}$ amplified by a factor $(1+C_1/C)$ is passed on to the capacitor $C_{m+1}$. For a good functioning of the stage $m$ of the circuit of FIG. 10 it is necessary that $C_2 \geq C_1$ so that the charge removed by the transistor $TR_2$ is amply sufficient to be able to possibly fully discharge the capacitor $C_1$.

Figure 11:
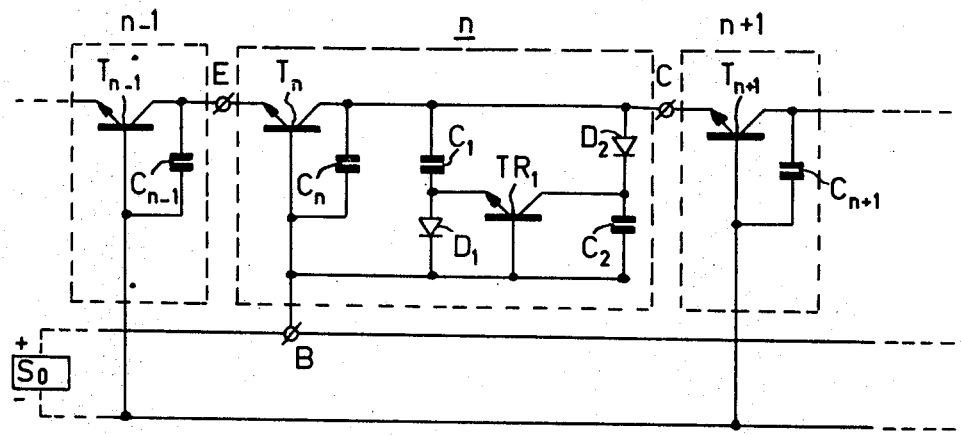
FIG. 11 shows the circuit of a unit $n$ which may replace at least one of the units of the FIGS. 3, 6, 8, 12 and 17.

It is also achieved that the mentioned losses remain limited or can be fully compensated by replacing at least one stage of the devices of FIGS. 3, 6 or 8 by a stage $n$ of the circuit of FIG. 11. The stage $n$ shown in the figure has an emitter input E, a base input B and a collector output C. The capacitor $C_n$ is provided between the collector and the base of the transistor $T_n$. The series combination of the capacitor $C_1$ and the diode $D_1$ on the one hand and the series combination of the capacitor $C_2$ and the diode $D_2$ on the other hand are provided parallel across this capacitor. The junction between the capacitor $C_1$ and the diode $D_1$ is also connected to the emitter of the auxiliary transistor $TR_1$ while the junction between the capacitor $C_2$ and the diode $D_2$ is also connected to the collector of the auxiliary transistor. The base of the auxilary transistor is connected to the base of the transistor $T_n$. The operation of the stage $n$ of the circuit of FIG. 11 is as follows:

During the time intervals $\tau_0$, $\tau_2$, $\tau_4$ and $\tau_6$ of FIG. 5a the transistor $T_{n+1}$ conducts and the capacitors $C_n$, $C_1$ and $C_2$ are charged until the voltages across these capacitors have become equal to E volt. During the time intervals $\tau_1$, $\tau_3$, $\tau_5$ and $\tau_7$ of FIG. 5a the capacitors $C_n$, $C_1$ and $C_2$ are partly discharged. The voltage drop $\Delta x$ across the capacitors $C_n$ and $C_1$ will be equal to:

$$\Delta x = \frac{C}{C+C_1} \cdot \Delta V \text{ volt}$$

in which C is the capacitance value of capacitors $C_{n-1}$, $C_n$ and $C_{n+1}$ and in which V is the voltage difference between the voltages across the capacitors $C_{n-1}$ and $C_n$ during the time intervals $\tau_0$, $\tau_2$, $\tau_4$ and $\tau_6$. The voltage drop across the capacitor $C_2$ is equal to $$\frac{C_1}{C_2} \cdot x \text{ volt}$$

During the time intervals that the transistor $T_{n+1}$ conducts the capacitors $C_n$, $C_1$ and $C_2$ are charged as mentioned until the voltage across these capacitors has become equal to E volt. The capacitor $C_{n+1}$ is partly discharged by the transistor $T_n$ during the same time intervals. The voltage drop across the capacitor $C_{n+1}$ will be equal to $$\frac{C+2C_1}{C+C_1} \cdot \Delta V \text{ volt}$$

in which C is the capacitance value of the capacitors $C_{n-1}$, $C_n$ and $C_{n+1}$. Consequently, by providing the stage $n$ between the stages $(n-1)$ and $(n+1)$ of FIG. 11 it is achieved that the information $\Delta V$ in the capacitor $C_{n-1}$ amplified by a factor $(1+C_1/C_1+C)$ is passed on to the capacitor $C_{n+1}$. For a good functioning of the stage $n$ of the circuit of FIG. 11 is necessary that $C_2 \geq C_1$ because otherwise the voltage across the capacitor $C_2$ will decrease more rapidly than the voltage across the capacitor $C_1$. As a result the diode $D_2$ will start conducting, which is undesirable.

Figure 19:
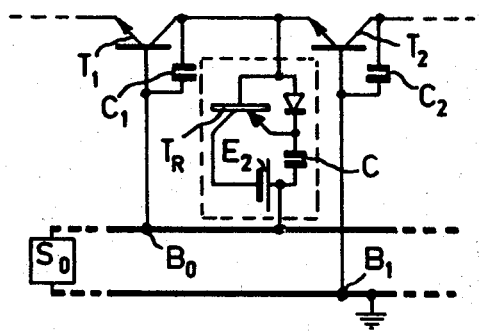
FIG. 19 shows a dipole which may be arranged in parallel with one or more first capacitors in the stages $o$ to $n$ in the circuit according to FIG. 3.

It is also achieved that the mentioned losses in the circuit according to FIG. 3 remain limited or can fully be compensated by arranging a dipole in parallel with one or more of the first capacitors in the stages $o$ to $n$. This dipole comprises the series-combination of a diode which conducts during the transfer of charge and an additional capacitor which constitutes the output impedance between the emitter and the collector of an auxiliary transistor, the base-emitter path of which is connected in parallel opposition to the said diode, the junction of the diode and the base of the auxiliary transistor being connected to that side of the first capacitor from which the charge for the second capacitor is derived. In FIG. 19 the dipole is shown between the broken lines. The voltage source $E_2$ provides the charge current for the additional capacitor C. During the times of each scan period T in which point $B_1$ has a potential of $-E$ volts relative to point $B_0$, both capacitors $C_1$ and C will be charged until the voltage across each of them has become equal to E volts, no allowance being made for the internal base emitter threshold voltage of the transistors $T_2$ and $T_r$. During this period the transistor $T_1$ is in the cut-off condition. During the times of each scan period T in which the transistor $T_1$ conducts and the transistor $T_2$ is cut-off, information will be passed from a preceding capacitor to the capacitor $C_1$. A current will flow through transistor $T_1$ and cause a voltage drop, across capacitor $C_1$. In the first instance the voltage across capacitor C will remain equal to E volts but as soon as the voltage capacitor $C_1$ has decreased the auxiliary transistor $T_r$ will become conducting so that the voltage across capacitor C will also decrease. If the voltage drop across capacitor $C_1$ is assumed to be $\Delta V$ volts this means that the voltage drop across capacitor C is equal to $\Delta V$ volts, no allowance being made for the internal base-emitter threshold voltage of the auxiliary transistor $T_r$. If, now, transistor $T_2$ commences to conduct the information $\Delta V$ from the capacitors $C_1$ and C will be passed to the capacitor $C_2$, which has a value equal to that of capacitor $C_1$. If the collector-emitter current-gain factor of transistor $T_2$ is assumed to be equal to unity and the internal base-emitter threshold voltage of auxiliary transistor $T_r$ is disregarded, then during the time in which transistor $T_2$ conducts the voltage across capacitor $C_2$ will decrease by an amount of $(1+C/C_2) \Delta V$ volts. Thus the amplification of the information $\Delta V$ is equal to the factor $(1+C/C_2)$. If, for example, C is 240 pfs. and $C_1=C_2=200$ pfs., the amplification of the information is equal to a factor of 2.2.

Figure 12:
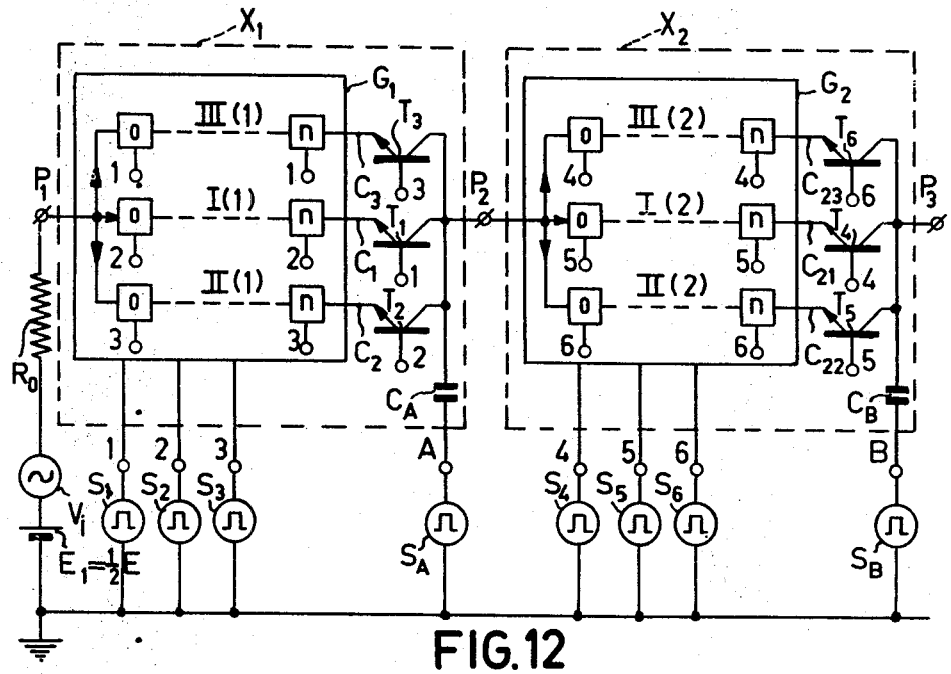

In FIG. 12, $X_1$ and $X_2$ are two identical units which are variants of the device of FIG. 8. These units $X_1$ and $X_2$ have, however, the advantage that they can be connected in cascade without further external connections. This is especially important when integrating such units in which the mutual dividing and combining again of the parallel circuits in each unit shown in FIG. 12 must take place as much as possible within the integrated circuit so that only two wires are necessary for the input and output of the electric signal to be handled. The portions of the device of FIG. 12 ($G_1$ and $G_2$) situated within the full lines are identical to the portion of the device of FIG. 8 situated within the broken lines. The junctions 1, 2 and 3 and the junctions 4, 5 and 6 of FIG. 12 correspond to the junctions $B_1$, $B_2$, $B_3$ of FIG. 8. The junctions $C_1$, $C_2$, $C_3$ and the junctions $C_{21}$, $C_{22}$, $C_{23}$ of FIG. 12 correspond to the junctions $C_1$, $C_2$, $C_3$ of FIG. 8. The input $P_1$ of the unit $X_1$ which connects the three inputs of the chain circuits I, II and III is connected to a point of constant potential through the series combination of the resistor $R_0$ and the signal voltage source $V_i$. The outputs $C_1$, $C_2$ and $C_3$ of the chain circuits I, II and III are connected to the emitters of the respective transistors $T_1$, $T_2$ and $T_3$ while the collectors of these transistors are connected to the output circuit of the unit $X_1$. The output terminal $P_2$ of the unit $X_1$ is connected on the one hand to the input of the identical unit $X_2$ and on the other hand to earth through the series combination between the capacitor $C_A$ and the switching voltage source $S_A$. The supply junctions 1, 2 and 3 shown in FIG. 12 are connected to earth through the switching voltage sources $S_1$, $S_2$ and $S_3$ respectively. The supply junctions 4, 5 and 6 shown in FIG. 12 are connected to earth through the switching voltage sources $S_4$, $S_5$ and $S_6$ respectively. The output circuit $P_3$ of the unit $X_2$ is connected to earth through the series combination between the capacitor $C_B$ and the switching voltage source $S_B$. The FIG. 13a to h show the voltages which are supplied by the switching voltage sources $S_1$ to $S_6$, $S_A$ and $S_B$ as a function of time.

During the time interval $\tau_1$ of a switching cycle T the junctions 1 and A have a positive potential relative to earth. As a result the information regarding the magnitude of the input signal $V_i$ will be stored in the 0° stage of the chain circuit III (1) while the information stored in the $n°$ stage of the chain circuit I (1) is passed on to the auxiliary capacitor $C_A$ through the transistor $T_1$. During the time interval $\tau_2$ of each switching cycle T the junctions 4 and B have a positive potential relative to earth. As a result the information which is stored in the capacitor $C_A$ during the time interval $\tau_1$ will be passed on to the 0° stage of the chain circuit III (2) of the unit $X_2$. During the time interval $\tau_3$ of each switching cycle the information from the $n°$ stage of the chain circuit I (1) is passed on to the auxiliary capacitor $C_A$ while this information is passed on again to the 0° stage of the chain circuit I (2) of the unit $X_2$ during the time interval $\tau_4$. During the time interval $\tau_5$ of each switching cycle T the information from the $n°$ stage of the chain circuit II (1) is passed on to the auxiliary capacitor $C_A$ while this information is passed on again to the 0° stage of the chain circuit II (2) of the unit $X_2$ during the time interval $\tau_6$ of each switching cycle T.

Figure 14:
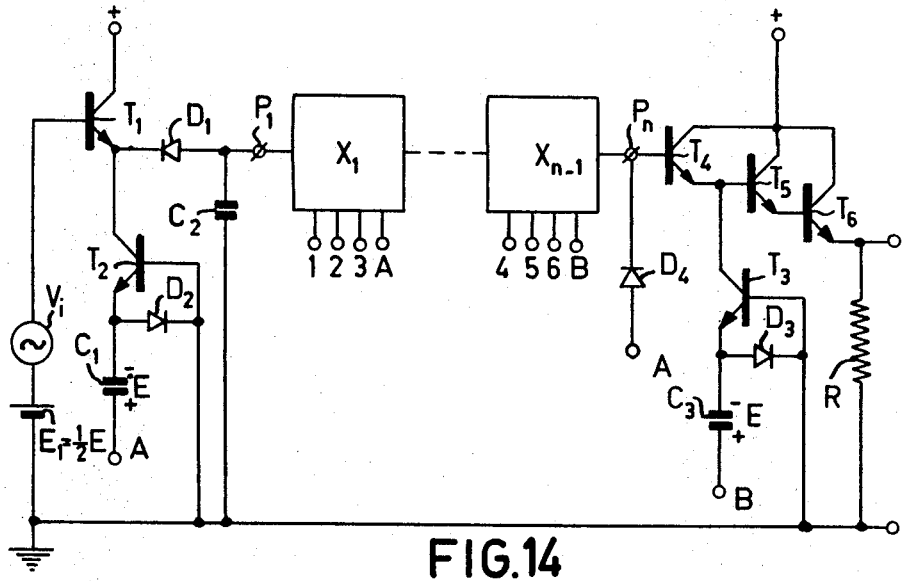
FIG. 14 shows the device of FIG. 12 in which other input and output circuits are used.
Figure 13:
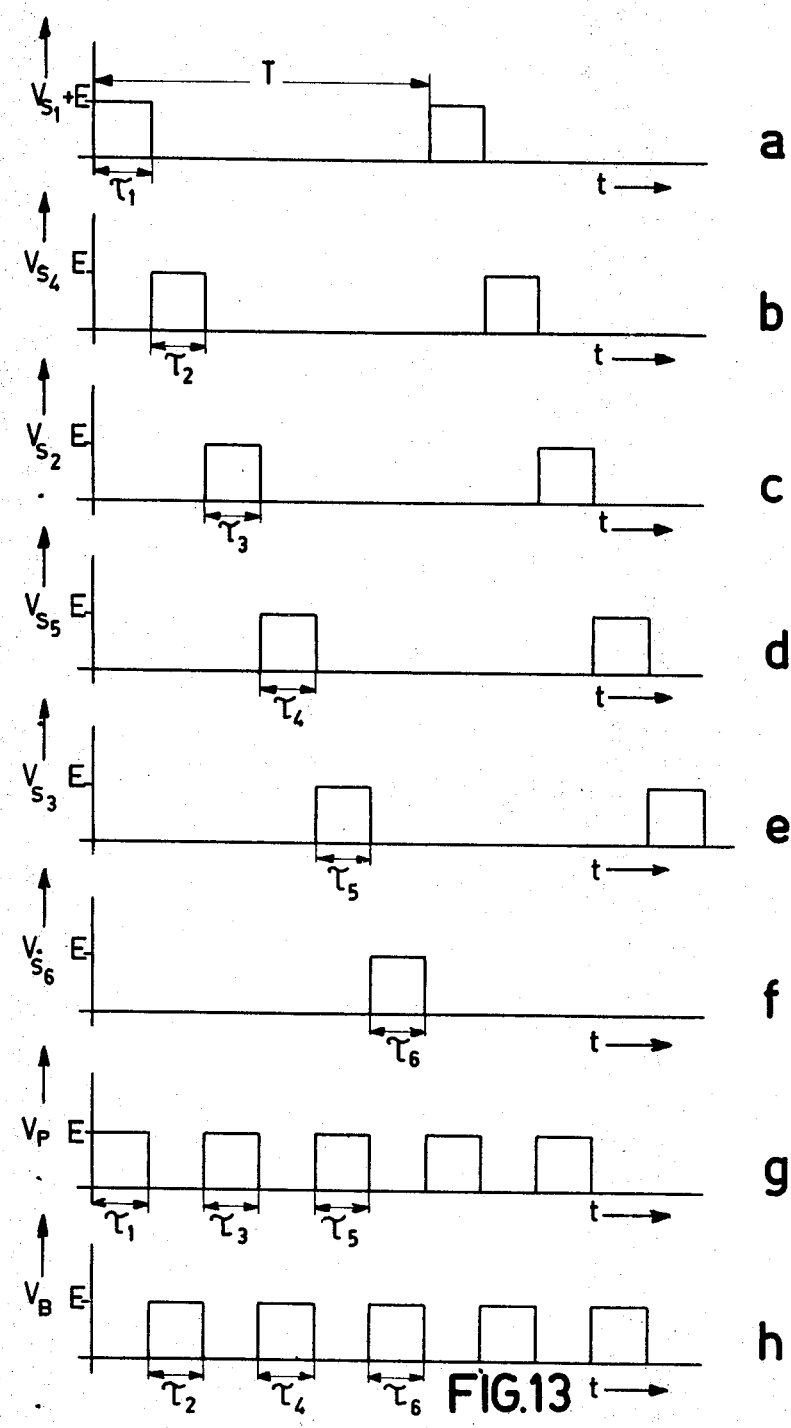
FIG. 13 shows as a function of time the variations in the voltages from the switching voltage sources $S_1$–$S_6$ and $S_A$, $S_B$ of FIG. 12.

FIG. 14 shows a device for retarding electric signals which has the additional advantage relative to the devices of FIGS. 3, 6, 8 and 12 that the zero adjustment is independent of frequency which is especially important for the use of the device as a variable delay line. The device is built up of units of FIG. 12 in which only shows the units $X_1$ and $X_{n-1}$. The junctions 1, 2, 3 and A of the unit $X_1$ are connected to earth in the manner shown in FIG. 12 through the switching voltage sources $S_1$, $S_2$, $S_3$ and $S_A$. The junctions 4, 5, 6 and B of the unit $X_{n-1}$ are connected to earth in the manner shown in FIG. 12 for the unit $X_2$ through the switching voltage sources $S_4$, $S_5$, $S_6$ and $S_b$. For the sake of clarity of FIG. 14 the switching voltage sources are not shown in this figure. The input $P_1$ of the unit $X_1$ is connected on the one hand to earth through the capacitor $C_2$ and on the other hand through the diode $D_1$ to the emitter of the transistor $T_1$ connected as an emitter follower the base of which is connected to a point of constant potential through the signal voltage source $V_i$. The emitter of the transistor $T_1$ is connected to the collector of the transistor $T_2$ the base of which is connected to earth on the one hand and on the other hand through the diode $D_2$ to the emitter of the transistor $T_2$. The emitter of the transistor $T_2$ is connected through the capacitor $C_1$ to junction A which is connected to earth through the switching voltage source $S_B$. The output $P_n$ of the unit $X_{n-1}$ is connected on the one hand to junction A through the diode $D_4$ and on the other hand to the base of the transistor $T_4$. The emitter of the transistor $T_4$ is connected on the one hand to the base of the transistor $T_5$ and on the other hand to the collector of the transistor $T_3$ the base of which is connected to earth on the one hand and to the emitter of the transistor $T_3$ through the diode $D_3$ on the other hand. The emitter of the transistor $T_3$ is connected through the capacitor $C_3$ to junction B which is connected to earth through the switching voltage source $S_B$. The emitter of the transistor $T_5$ is connected to the base of the transistor $T_6$ the emitter of which is connected to earth through the load resistor R. The collectors of the transistors $T_4$, $T_5$ and $T_6$ and jointly connected to a point of constant potential.

At the instants when the junction A of the capacitor $C_1$ has a positive potential relative to earth (FIG. 13g) the transistor $T_2$ is not conducting and the capacitor $C_1$ is charged until the voltage across this capacitor has become equal to E volt as is indicated in FIG. 14. At the mentioned instants one of the junctions 1, 2 or 3 has also a positive potential relative to earth so that the transistor is conducting in one of the 0° stages of the unit $X_1$ (FIG. 12) so that the information stored in the capacitor $C_2$ is passed on to the capacitor which is situated in the conductive stage. The capacitor $C_2$ is also charged at the mentioned instants until the voltage across the capacitor $C_2$ has become equal to E volt. At the instants when the junction A of the capacitor $C_1$ has the earth potential the transistor $T_2$ is conductive as a result of the charge $Q=C_1E$ stored in the capacitor $C_1$ and hence the transistor $T_1$ is also conductive. As a result charge from the capacitor $C_2$ will flow away through the diode $D_1$ namely so much charge until the voltage across the capacitor $C_2$ has become equal to $(\frac{1}{2}E+V_1)$ volt, being the sum of the voltages between the D.C. voltage source $E_1$ and the signal voltage source $V_i$ between the base of the transistor $T_1$ and earth. As soon as the voltage across the capacitor $C_2$ has become equal to this $(\frac{1}{2}E+V_1)$ volt the diode $D_1$ becomes non-conductive. The transistor $T_1$ becomes non-conductive as soon as the transistor $T_2$ is not conductive which takes place as soon as the capacitor $C_1$ is fully discharged. For a good operation of the input circuit of FIG. 14 it is therefore necessary that $C_1 \geqslant C_2$.

The output circuit of the device of FIG. 14 which is formed by the transistors $T_3$, $T_4$, $T_5$ and $T_6$, the diode $D_3$, the capacitor $C_3$ and the load resistor R has the advantage on the one hand that it has such a high input resistance that the output capacitance $C_6$ of the unit $X_{n-1}$ is substantially not charged which is important at low switching frequencies (audio frequencies) and on the other hand it has the advantage that there is no distortion of the signal at high switching frequencies (video frequencies). The operation of the output circuit of FIG. 14 is as follows:

At the instants when the junction B of the capacitor $C_3$ has a positive potential relative to earth the capacitor $C_3$ is charged until the voltage across it has become equal to E volt as shown in FIG. 14. At the mentioned instants also junction B of the unit $X_{n-1}$ has a positive potential relative to earth so that the information from one of the $n°$ stages of the unit $X_{n-1}$ is passed on to the capacitor $C_B$ of the unit $X_{n-1}$ (see FIG. 12). At the mentioned instants the voltage between the base of the transistor $T_4$ and earth is equal to $(E+V_e)$ in which $V_e$ is equal to the voltage across the capacitor $C_B$ of the unit $X_{n-1}$. This voltage is equal to that across the load resistor to the neglect of the base emitter threshold voltages of the transistors $T_4$, $T_5$ and $T_6$. The input impedance of the output circuit at the mentioned instants is approximately equal to $\beta^3 \cdot R$ in which $\beta$ is the collector base current gain factor of the transistors $T_4$, $T_5$ and $T_6$. At a $\beta=100$ and a $R=1000\Omega$ this results in an input impedance of 1,000 M$\Omega$ which is connected parallel across the capacitor $C_B$ of the unit $X_{n-1}$.

At the instants when the junction A of the diode $D_4$ has a positive potential relative to earth, while the junctions B of the unit $X_{n-1}$ and the capacitor $C_3$ have the earth potential, the diode $D_4$ is conductive so that the capacitor $C_B$ of the unit $X_{n-1}$ is charged until the voltage across this capacitor has become equal to E volt. Since the junction B of the capacitor $C_3$ has the earth potential at these instants the transistor $T_3$ becomes conductive as a result of the charge $Q=C_3E$ stored in the capacitor $C_3$. As a result the charge in the stray capacitance between the base and the emitter of the transistor $T_4$, together with the charge of the total stray capacitances between the emitter of the transistor $T_4$ and earth, can flow away rapidly which results in the voltage drop at the base of the transistor $T_4$ being followed very rapidly by the emitter of the transistor $T_4$ so that no distortion of the signal to be retarded occurs at high switching frequencies.

Figure 15:
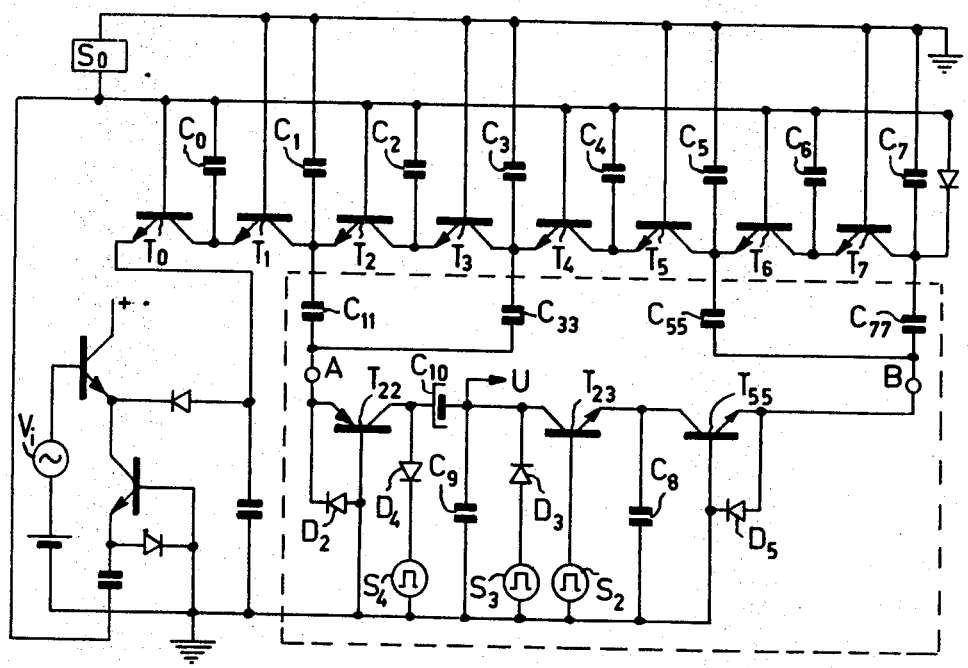
Figure 17:
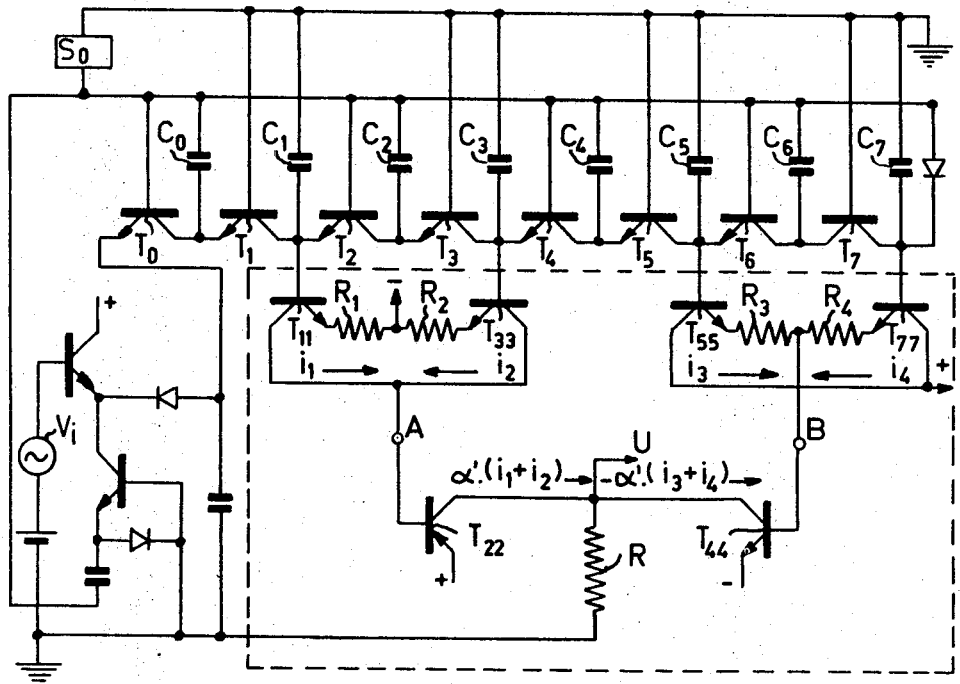

The delay line shown in FIG. 3 can be used with advantage to realize a filter for electric signals as is indicated in the FIGS. 15 and 17. In the filter shown in FIG. 15 the connection ends of the second capacitors adjacent the collector from the delay stages 1, 3, 5 and 7 are connected to a combination device which is formed by the transistor $T_{22}$, $T_{23}$ and $T_{55}$, the diodes $D_2$, $D_3$, $D_4$ and $D_5$ and the capacitors $C_{11}$, $C_{33}$, $C_{55}$, $C_{77}$, $C_8$, $C_9$ and $C_{10}$. The connection ends of the said second capacitors remote from the collector are jointly connected to a point of constant potential. The collectors of the transistors $T_1$ and $T_3$ are connected through the capacitors $C_{11}$ and $C_{33}$ respectively to the emitter of the transistor $T_{22}$ the base of which is connected to earth while the diode $D_2$ is connected antiparallel across the base emitter path of this transistor. The collectors of the transistors $T_5$ and $T_7$ are connected through the capacitors $C_{55}$ and $C_{77}$ respectively the base of which is connected to earth while the diode $D_5$ is connected antiparallel across the base emitter path of this transistor. The collector of the transistor $T_{55}$ is connected on the one hand to earth through the capacitor $C_8$ and on the other hand to the emitter of the transistor $T_{23}$ the base of which is connected to earth through the switching voltage source $S_2$ and the collector of which is also connected to earth through the series combination of the diode $D_3$ and the switching voltage source $S_3$. The collector of the transistor $T_{22}$ is connected to earth through the series combination of the diode $D_4$ and the switching voltage source $S_4$. The output U of the filter is connected to earth through the capacitor $C_8$ on the one hand and to the collector of the transistor $T_{23}$ on the other hand while the output is connected to the collector of the transistor $T_{22}$ through the capacitor $C_{10}$.

Figure 16:
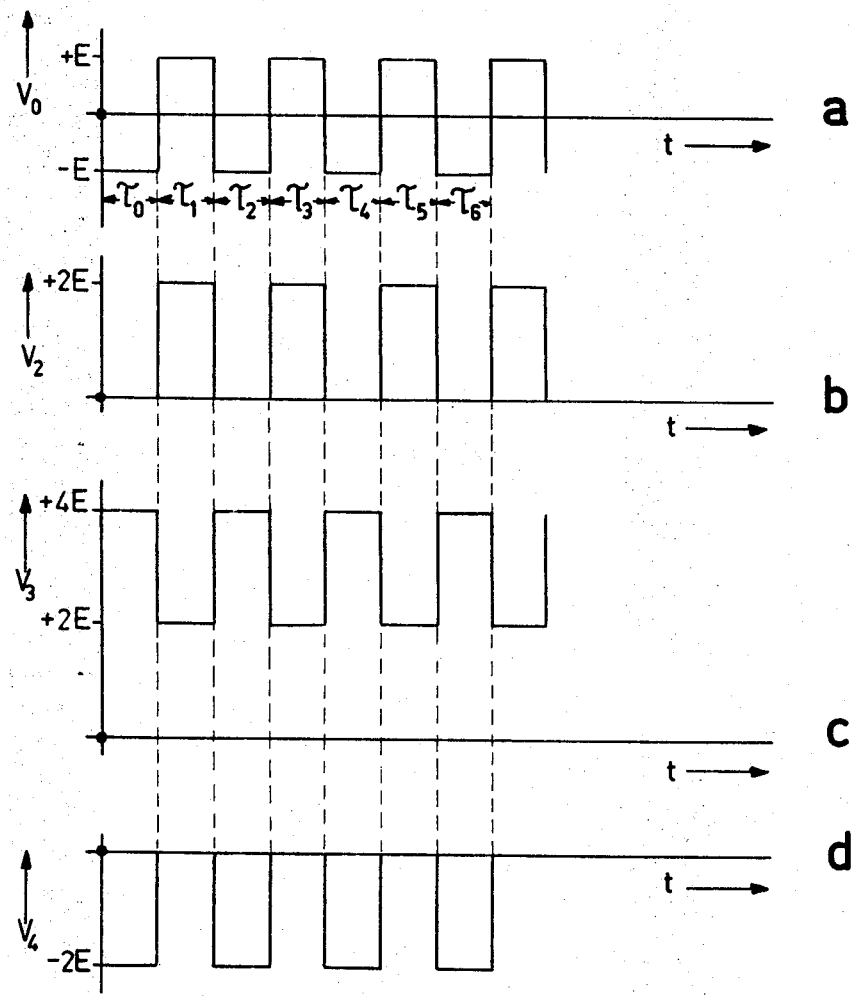
FIG. 16 shows as a function of time the variations in the voltages from the switching voltage sources $S_0$, $S_2$, $S_3$ and $S_4$ of FIG. 15.

During the time intervals $\tau_1$, $\tau_3$ and $\tau_6$ of FIG. 16 new information regarding the magnitude of the input signal is stored in the capacitor $C_0$. The information stored in the odd capacitors $C_1$, $C_3$ and $C_5$ is passed on to the even capacitors $C_2$, $C_4$ and $C_6$ charge being supplied to the odd capacitors during the mentioned time intervals until the voltage across these capacitors has become equal to E volts. During these time intervals a voltage of $+2E$ volt is present between the base of the transistor $T_{23}$ and earth, a voltage of $+2E$ volt between the diode $D_3$ and earth and a voltage of zero volt between the diode $D_4$ and earth. The transistors $T_{22}$, $T_{23}$ and the diode $D_5$ are conductive during the mentioned time intervals. The capacitors $C_{11}$, $C_{33}$, $C_{55}$ and $C_{77}$ are charged until the voltage across these capacitors has become equal to E volt while the capacitor $C_8$ is charged until the voltage across this capacitor has become equal to 2E volt. The amount of charge which will flow through the capacitor $C_{11}$ during, for example, the time interval $\tau_1$ will be equal to $$\frac{C_{11}}{C_1+C_{11}} \cdot C_0 \cdot \Delta V_0(\tau)$$

in which $C_0 \cdot \Delta V_0(\tau)$ is the charge which was necessary $\tau$ seconds earlier, thus during the time intervals $\tau_0$, to make the voltage across the capacitor $C_0$ equal to E volt. Likewise the charge which will flow through the capacitor $C_{33}$ during the mentioned time interval will be equal to $$\frac{C_{33}}{C_3+C_{33}} \cdot C_2 \cdot \Delta V_2(\tau)$$

in which $C_2 \cdot \Delta V_2(\tau)$ is the charge which was necessary $\tau$ seconds earlier, thus during the time interval $\tau_0$, to make the voltage across the capacitor $C_2$ equal to E volt. If the capacitance values of the capacitors $C_0$ to $C_9$ are equal to C then this means that during the time interval $\tau_{11}$ the capacitor $C_9$ receives a supply of charge through the transistor $T_{22}$ which is equal to $$Q_9(1) = C\left[\frac{C_{11}}{C+C_{11}} \cdot \Delta V_0(\tau) + \frac{C_{33}}{C+C_{33}} \cdot \Delta V_2(\tau) + \cdots \right] \quad (1)$$

In the given example of FIG. 15 the junction A of the combination device is only connected through the capacitors $C_{11}$ and $C_{33}$ to two junctions of the delay line of FIG. 15. By extension of the number of delay stages this number can be increased without further which is indicated in the Equation 1 by an additional + symbol.

During the time interval $\tau_0$ a voltage of $-2E$ volt is present between the diode $D_4$ and earth according to FIG. 16, a voltage of $+4E$ volt between the diode $D_3$ and earth while the base of the transistor $T_{23}$ has the earth potential. The capacitor $C_9$ will be charged through the diode $D_4$ until the voltage across this capacitor has become equal to 4E volt while the capacitor $C_{10}$ is charged through the diodes $D_3$ and $D_4$ until the voltage across this capacitor has become 6E volt. During the time interval $\tau_0$ the capacitors $C_4$ and $C_6$ are charged until the voltage across these capacitors has become equal to E volt. The charge $C.\Delta V_4$ necessary for this purpose for the capacitor $C_4$ will flow through the two capacitors $C_5$ and $C_{55}$ and the voltage across the latter two capacitors will decrease to an amount equal to $$\Delta x = \frac{C}{C+C_{55}} \cdot \Delta V_4$$

The charge which consequently flows through the capacitor $C_{55}$ is equal to $C_{55}.\Delta x$. The charge $C.\Delta V_0$ necessary for this purpose for the capacitor $C_6$ will flow through the two capacitors $C_7$ and $C_{77}$ and will decrease the voltage across the latter two capacitors by an amount equal to $$\Delta y = \frac{C}{C+C_{77}} \cdot \Delta V_6$$

The charge which consequently flows through the capacitor $C_{77}$ is equal to $C_{77}.\Delta y$. The sum of the charges $C_{55}.\Delta x$ and $C_{77}.\Delta y$ is derived from the charge of the capacitor $C_8$. That sum is thus equal to $$Q_8 = C\left[\frac{C_{55}}{C+C_{55}} \cdot \Delta V_4 + \frac{C_{77}}{C+C_{77}} \cdot \Delta V_6 + \cdots \right] \quad (2)$$

During the time interval $\tau_1$, thus $\tau$ seconds later, the capacitor $C_8$ is charge until the voltage across this capacitor has become equal to 2E volt. The amount of charge required for this purpose is derived from the capacitor $C_9$. The charge which is derived from the capacitor $C_9$ is thus equal to $$Q_9(2) = -C\left[\frac{C_{55}}{C+C_{55}} \cdot \Delta V_4(\ ) + \frac{C_{77}}{C+C_{77}} \cdot \Delta V_6(\ ) + \cdots \right] \quad (3)$$

in which $C.\Delta V_4(\tau)$ is the charge which was necessary $\tau$ second earlier to make the voltage across the capacitor $C_4$ equal to E volt and $C.\Delta V_6(\tau)$ is the charge which was necessary $\tau$ second earlier to make the voltage across the capacitor $C_6$ equal to E volt. In the given example of FIG. 15 and junction B of the combination device is only connected to two junctions of the delay line. By extension of a number of delay stages this number can be increased. The total charge which flows through the capacitors $C_9$ during the time interval $\tau_1$ considered is equal to $$Q_9 = C.[a_1.\Delta V_0(\tau) + a_2.\Delta V_2(\tau) + \cdots \\ - b_1.\Delta V_4(\tau) - b_2.\Delta V_6(\tau) - \cdots ] \quad (4)$$

in which $a_1 = C_{11}/C + C_{11}$, $a_2 = C_{33}/C + C_{33}$, $$b_1 = C_{55}/C + C_{55}, \quad b_2 = C_{77}/C + C_{77}$$

If it is assumed that the analogous signal supplied by the signal voltage source $V_i$ comprises a spectrum component of angular frequency $w$ and amplitude A then $\Delta V.e^{jwt}$ can be written in complex writing for the voltage drop $\Delta V_0$ across the capacitor $C_0$ in which $\Delta V$ is directly proportional to the amplitude A of the spectrum component considered. In succeeding delay stages the relevant spectrum component is passed on over periods $\tau$, $2\tau$, $3\tau$, $4\tau$, $5\tau$, $6\tau$, $7\tau$ which spectrum component passed over this period can be written as $$\Delta V.e^{jw(t-\tau)}, \Delta V.e^{jw(t-2\tau)}, \Delta V.e^{jw(t-3\tau)}, \Delta V.e^{jw(t-4\tau)}$$
$$\Delta V.e^{jw(t-5\tau)}, \Delta V.e^{jw(t-6\tau)}, \Delta V.e^{jw(t-7\tau)}$$

In the Formula 4 for the total charge which flow through the capacitor $C_9$ there applies $$\Delta V_0(\tau) = \Delta V.e^{jw(t-\tau)}, \Delta V_2(\tau) = \Delta V.e^{jw(t-3\tau)}$$
$$\Delta V_4(\tau) = \Delta V.e^{jw(t-5\tau)}, \Delta V_6(\tau) = \Delta V.e^{jw(t-7\tau)}$$

By filling in the above-mentioned equations in Formula 4 by subsequently arranging and by dividing by C the voltage drop across the capacitor $C_9$ is found as a function of time.

$$\Delta V_9 = \Delta V.e^{jw(t-4\tau)}[a_1.e^{jw3\tau} + a_2.e^{jw\tau} + \cdots \\ - b_1.e^{-jw\tau} - b_2.e^{-jw3\tau} - \cdots] \quad (5)$$

A random spectrum component $\Delta V.e^{jwt}$ in the frequency spectrum of the signal supplied to the capacitor $C_0$ yields an output signal as in Formula 5 so that for the transfer characteristic $H(w)$ of the device formed by the delay line from the capacitor $C_0$ and the combination device we have:

$$H(w) = e^{-jw4\tau}.[a_1.e^{jw3\tau} + a_2.e^{jw\tau} + \cdots \\ - b_1.e^{-jw\tau} - b_2.e^{-jw3\tau} - \cdots] \quad (6)$$

By suitable choice of the transfer coefficients $a_1$, $a_2 \ldots b_1$, $b_2 \ldots$ a random amplitude frequency characteristic and phase frequency characteristic can be realized.

In the filter of FIG. 17 the connection ends of the second capacitors adjacent the collector from the delay stages 1, 3, 5 and 7 are connected to a combination device which is formed by the transistors $T_{11}$, $T_{22}$, $T_{33}$, $T_{44}$, $T_{55}$, $T_{77}$ and the resistors $R_1$, $R_2$, $R_3$, $R_4$, R. The connection ends of the said second capacitors are connected to the base electrodes of the n-p-n transistors $T_{11}$, $T_{33}$, $T_{55}$ and $T_{77}$ respectively. The collector electrodes of the transistors $T_{11}$ and $T_{33}$ are connected to the base of the p-n-p transistor $T_{22}$. The emitter electrodes of the transistors $T_{11}$ and $T_{33}$ are connected through the resistors $R_1$ and $R_2$ respectively to a point of constant potential. The collector of the transistor $T_{22}$ is connected through the output resistor R to a point of constant potential while the emitter of the transistor $T_{22}$ is also connected to a point of constant potential. The collector electrodes of the transistors $T_{55}$ and $T_{77}$ are connected to a point of constant potential while the emitter electrodes of the transistors $T_{55}$ and $T_{77}$ are connected through the resistors $R_3$ and $R_4$ respectively to the base of the n-p-n transistor $T_{49}$ the collector of which is connected to the collector transistor $T_{23}$ while the emitter is connected to a point of constant potential.

If it is assumed that the analogous signal supplied by the signal voltage source $V_i$ comprises a spectrum component of angular frequency $w$ and amplitude A then $\Delta V.e^{jwt}$ can be written in complex writing for the voltage drop $\Delta V_0$ across the capacitor $C_0$ from the delay stage 0 in which $\Delta V$ is directly proportional to the amplitude A of the spectrum component considered. In succeeding delay stages 1, 2, 3, 4, 5, 6, 7 the relevant spectrum component is passed on over periods $\tau, 2\tau, 3\tau, 4\tau, 5\tau, 7\tau$ which components passed over this period can be written as $$\Delta V.e^{jw(t-\tau)}, \Delta V.e^{jw(t-2\tau)}, \Delta V.e^{jw(t-3\tau)}, \Delta V.e^{jw(t-4\tau)},$$
$$\Delta V.e^{jw(t-5\tau)}, \Delta V.e^{jw(t-6\tau)}$$

As a result of the signal $\Delta V.e^{jw(t-\tau)}$ at the base of the transistor $T_{11}$ and the signal $\Delta V.e^{jw(t-3\tau)}$ at the base of the transistor $T_{33}$ a base current will flow through the transistor which is equal to $$i_1 + i_3 = \frac{\Delta V}{R_1} \cdot e^{jw(t-\tau)} + \frac{\Delta V}{R_2} \cdot e^{jw(t-3\tau)} + \ldots \quad (7)$$

As a result of the signal $\Delta V.e^{jw(t-5\tau)}$ at the base of the transistor $T_{55}$ and the signal $\Delta V.e^{jw(t-7\tau)}$ at the base of the transistor $T_{77}$ a base current will flow through the transistor $T_{44}$ which is equal to $$i_5 + i_7 = \frac{\Delta V}{R_3} \cdot e^{jw(t-5\tau)} + \frac{\Delta V}{R_4} \cdot e^{jw(t-7\tau)} + \ldots \quad (8)$$

A current will now flow through the output resistor R which is equal to the difference between the currents of Formulas 7 and 8 so that the increase of voltage $\Delta V(R)$ across this resistor will be equal to $$\Delta V(R) = \beta \Delta V \cdot e^{jw(t-4\tau)} \left[ \frac{R}{R_1} \cdot e^{jw3\tau} + \frac{R}{R_2} \cdot e^{jw\tau} + \ldots \right.$$
$$\left. - \frac{R}{R_3} \cdot e^{-jw\tau} - \frac{R}{R_4} \cdot e^{jw\tau} - \ldots \right] \quad (9)$$

A random spectrum component $\Delta V.e^{jwt}$ in the frequency spectrum of the signal supplied to the capacitor $C_0$ yields an output signal such as in Formula 9, so that for the transfer characteristic $H(w)$ of the device we have:

$$H(w) = \beta \cdot e^{-jw4\tau} [a_1 \cdot e^{jw3\tau} + a_2 \cdot e^{jw\tau} + \ldots - b_1 \cdot e^{-jw\tau}$$
$$- \beta_2 \cdot e^{-jw3\tau} - \ldots ] \quad (10)$$

in which $a_1 = {}^R/R_1$, $a_2 = {}^R/R_2$ $b_1 = {}^R/R_3$ and $b_2 = {}^R/R_4$.

By suitable choice of the transfer coefficients $a_1$, $a_2$, $b_1$, $b_2$ a random transfer characteristic can be realized.

By providing a feedback between the collector output of the delay stage $n$ and the emitter input of the delay stage $o$ and the omission of the stage $(n+1)$ of FIG. 3 another type of filter for electric signals can be realized. If the transfer function of the delay line is equal to $$H(w) = \alpha.exp(-jw\tau)$$

then by providing said feedback the transfer function becomes equal to $$H^1(w) = \frac{\alpha \cdot \exp(-jw\tau)}{1 - \alpha \cdot \exp(-jw\tau)}$$

Figure 18:
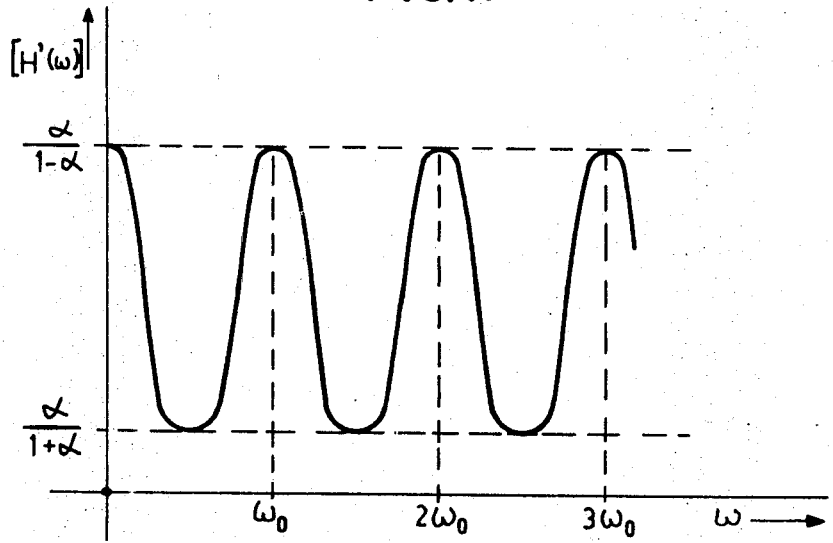
FIG. 18 shows the amplitude frequency characteristic of a comb filter.

The amplitude frequency characteristic has a comb-like form with adjustments which are given by the condition $exp(-jw\tau)=1$. This characteristic is shown in FIG. 18. If the delay line of FIG. 3 comprises $n$ capacitors and if the passing-on frequency is equal to $n.w.$ then the fundamental frequency of the comb filter becomes equal to $w_0$.

What is claimed is:

1. A delay line for delaying input signals from a signal source, comprising a source of switching pulses; a plurality of capacitor-charge transfer stages; each of said stages comprising a separate transistor having emitter, collector and base terminals, and a storage capacitor connected directly in parallel with the base and collector terminals, wherein the emitter and base terminals of the transistor respectively comprise the input and control terminals of each stage, and wherein the collector terminal of the transistor is connected to the output terminal of each stage; means for connecting each input terminal of all but a selected stage to the output terminal of an adjacent stage including the output terminal at the selected stage, the selected stage comprising the input stage of the delay line, the stage remote from the input stage comprising the output stage of the delay line; and means for applying a forward biassing switching pulse sequentially to the base terminals of adjacent stages, means for applying input signals to the input terminal of the input stage from the input signal source, the capacitor of the input stage attaining a charge corresponding to the level of the input signal on the input terminal thereof in response to the switching pulse on the control terminal thereof, the capacitor of each stage passing the charge level thereon to the adjacent stage connected to the output terminal thereof in response to a switching pulse on the control terminal of the adjacent stage.

2. Apparatus as claimed in claim 1, further including a resistor connected in series between the input signal and the input terminal of the input stage of the delay line.

3. Apparatus as claimed in claim 1, wherein said input signal applying means comprises a first capacitor connected intermediate the input terminal of the input stage of the delay line and a point of constant potential, a first diode connected to the side of the first capacitor remote from the point of constant potential, a first auxiliary transistor having base, emitter and collector terminals, means for connecting the base and collector terminals of the first auxiliary transistor across the combination of the first diode and first capacitor, a second diode connected in parallel with the base and emitter terminals of the first auxiliary transistor, the first and second diodes and the collector-emitter path of the first auxiliary transistor forming a conduction path across the first capacitor wherein each element of the conduction path is polarized in the same direction, a second capacitor, means for connecting the second capacitor intermediate the switching pulse applying means and the emitter of the first auxiliary transistor, a second auxiliary transistor having base, emitter and collector terminals, and means for connecting input signals from the input signal source to the side of the first diode remote from the first capacitor through the base emitter path of the second auxiliary transistor, the collector of the second auxiliary transistor being biassed in the forward direction.

4. Apparatus as claimed in claim 1, further comprising an additional transistor, means for connecting the emitter of the additional transistor to the output terminal of the stage most remote from the input stage, and means for connecting the base and collector terminals of the additional transistor to the control terminal of the input stage of the delay line.

5. Apparatus as claimed in claim 1, further comprising a cascaded series of transistors, a resistor, means for connecting the output terminal of the stage most remote from the input stage to the resistor through the base and emitter terminals of the cascaded series of transistors, an auxiliary transistor, means for connecting the collector of the auxiliary transistor to the emitter of the transistor in the cascaded series most remote from the resistor, a diode connected in parallel with the base and emitter terminals of the auxiliary transistor, an auxiliary source of switching pulses, an auxiliary capacitor and means for connecting the emitter of the auxiliary transistor to the auxiliary source of switching pulses through the auxiliary capacitor.

6. Apparatus as claimed in claim 1, wherein at least one of the stages further comprises, a first auxiliary capacitor connected to the output terminal of the one stage, a first diode connected to the output terminal of the one stage, a second diode, means for connecting the side of the first auxiliary capacitor remote from the output terminal of the one stage to the control terminal of the one stage through the second diode, a second auxiliary capacitor, means for connecting the side of the first diode remote from the output terminal of the one stage to the control terminal of the one stage through the second auxiliary capacitor, an auxiliary transistor having base, emitter and collector terminals, means for connecting the base terminal of the auxiliary transistor to the control terminal of the one stage, means for connecting the emitter of the auxiliary transistor to the side of the second diode remote from the control terminal of the one stage, means for connecting the collector of the auxiliary transistor to the side of the first diode remote from the output terminal of the one stage, the first and second diodes and the collector emitter path of the auxiliary transistor forming a conduction path between the output and control terminals of the one stage wherein each element of the conduction path is polarized in the same direction.

7. Apparatus as claimed in claim 1, wherein at least one of the stages further comprises an auxiliary transistor having base, emitter and collector terminals, means for connecting the base terminal of the auxiliary transistor to the output terminal of the one stage, means for connecting the collector terminal of the transistor to the control terminal of the one stage, a diode connected in parallel with the base and emitter terminals of the auxiliary transistor, an auxiliary capacitor, and means for connecting the emitter of the auxiliary transistor to the control terminal of the one stage through the auxiliary capacitor, the diode and the collector emitter path of the auxiliary transistor forming a conduction path between the output and control terminals of the one stage wherein each element of the conduction path is polarized in the same direction.

8. Apparatus as claimed in claim 1, wherein the plurality of stages comprises a series of cascaded groups of $n$ ordered stages, wherein the switching pulse source comprises a separate switching source for each $n$th stage of a group, wherein the separate switching pulse sources provide non coincident switching pulses sequentially proceeding from the stage most remote from the input stage to the input stage, and wherein the recurrence frequency of each source is at least twice that of the highest signal source frequency.

9. Apparatus as claimed in claim 8, wherein the plurality of stages comprises $n$ series of the cascaded groups, wherein the input terminal of the input stage of each series is connected to a common point, and wherein the switching pulse sources connected to the control terminals of the input stages of each series sequentially provide non coincident switching pulses to each control terminal of the input stage of each series.

10. Apparatus as claimed in claim 1, for use as a filter for electric signals, further comprising means connected to the output terminals of alternate stages for combining the output signals, wherein the repetition frequency of the switching pulse source is higher than twice the frequency of the highest signal frequency to be filtered.

11. Apparatus as claimed in claim 10, wherein the combining means comprises an auxiliary transistor having base, emitter and collector terminals, at least two auxiliary capacitors, means for connecting one side of each auxiliary capacitor to the output terminal of each separate alternate stage, means for connecting the other side of each auxiliary capacitor to the emitter of the auxiliary transistor, a first diode connected in parallel with the base emitter terminals of the auxiliary transistor, the first diode and the base emitter terminals of the auxiliary transistor being oppositely polarized, a second diode, an auxiliary source of switching pulses, means for connecting the collector of the auxiliary transistor to the auxiliary switching pulse source through the second diode, and a pair of series connected output capacitors connected in parallel with the base and collector terminals of the auxiliary transistor, the output of the combining means comprising the junction of the output capacitors.

12. Apparatus as claimed in claim 10, wherein the combining means comprises a plurality of auxiliary capacitors, a first auxiliary transistor, means for connecting the output terminals of alternate stages of the delay line to the emitter of the first auxiliary transistor through the auxiliary capacitors, a first diode connected in parallel with the base and emitter terminals of the first auxiliary transistor, an additional capacitor connected in parallel with the base and collector terminals of the first auxiliary transistor, a second auxiliary transistor, means for connecting the emitter of the second auxiliary transistor to the collector of the first auxiliary transistor, a first auxiliary switching pulse source connected to the base of the second auxiliary transistor, a second diode, a second auxiliary source of switching pulses operating in phase opposition with the first auxiliary switching source, means for connecting the second auxiliary switching pulse source to the collector of the second auxiliary transistor through the second diode, the collector of the second auxiliary transistor comprising the output terminal of the combining means.

13. Apparatus as claimed in claim 12, wherein the combining means further comprises a second plurality of auxiliary capacitors, a third auxiliary transistor, means for connecting the output terminals of alternate stages of the delay line through the second plurality of auxiliary capacitor to the emitter terminal of the third auxiliary transistor, a third diode connected in parallel with the base and emitter terminals of the third auxiliary transistor, a third auxiliary switching pulse source providing switching pulses in phase opposition to the output of the second auxiliary switching pulse source, a fourth diode, means for connecting the third auxiliary switching pulse source to the collector of the third auxiliary transistor through the third diode, a series connected pair of additional capacitors connected in parallel with the base and collector terminals of the third transistor, and means for connecting the junction of the series connected pair of additional capacitors to the output terminal of the combining means.

14. Apparatus as claimed in claim 10, wherein the combining means comprises a plurality of auxiliary transistors of a first conductivity type, means for connecting the base of each auxiliary transistor to the output terminal of alternate stages of the delay line, a plurality of resistors each connected on one end to the emitter terminal of a separate auxiliary transistor, means for connecting the other ends of the resistors to a reference voltage, or additional transistor of a conductivity type opposite that of the auxiliary transistors, means for connecting the collectors of the auxiliary transistors to the base of the additional transistor, means for connecting the emitter of the additional transistor to a reference voltage, an additional resistor, and means for connecting the collector of the additional transistor to a reference voltage through the additional resistor.

References Cited

UNITED STATES PATENTS

| 3,058,012 | 10/1962 | Harling | 307—227 |
|---|---|---|---|
| 3,207,923 | 9/1965 | Prager | 328—186X |
| 3,289,010 | 11/1966 | Bacon et al. | 307—221 |
| 3,411,018 | 11/1968 | Dapper et al. | 307—235 |
| 3,443,190 | 5/1969 | Christiansen | 307—246X |

STANLEY D. MILLER, JR., Primary Examiner

U.S. Cl. X.R.

307—246, 294, 295; 320—1; 328—55